ns between various
United States Patent
Silvera et al.

[15] 3,693,104
[45] Sept. 19, 1972

[54] PHONON GENERATION HANDLING AND DETECTION

[72] Inventors: Isaac F. Silvera, Thousand Oaks; Lawrence A. Vredevoe, Santa Monica, both of Calif.

[73] Assignee: North American Rockwell Corporation

[22] Filed: June 5, 1970

[21] Appl. No.: 43,731

[52] U.S. Cl.....................330/5.5, 181/0.5 R, 329/1, 330/4.5, 331/94, 332/31
[51] Int. Cl................................................H01s 1/00
[58] Field of Search......330/5.5; 181/0.5 R, 0.5 AG, 181/0.5 J Primary Examiner—Roy Lake
Assistant Examiner—Darwin R. Hostetter
Attorney—L. Lee Humphries, H. Fredrick Hamann, Thomas S. MacDonald and Allan Rothenberg

[57] ABSTRACT

Microwave pumping of an alkali halide crystal doped with hydroxyl electric dipole impurity ions and subjected to a (001) dc electric field, will increase the population of the $3A_1$ dipolar energy level (the energy level notation applies to the usual case of preferred alignment of the hydroxyl dipoles along the (100) axes, such as in KC1) of the impurity ion when the microwave frequency is in resonance with the $1A_1$ $3A_1$ transition. Relaxation rates between various dipolar energy levels are shown to produce a population inversion between the $3A_1$ and $1B_1$ states and also between $2A_1$ and $1A_1$ states. Either spontaneous relaxation or stimulated relaxation from $3A_1$ $1B_1$ produces phonons having a preferred transverse polarization and a direction of propagation along the (110) axes of the crystal system. Tuning of the output beam of phonons over a phonon frequency range of about $10^9$ to $10^{11}$ Hz is achieved by a variation of the dc field. Variation of phonon absorption of an unpumped crystal in accordance with applied dc electric field and the depolarization induced by such absorption are employed to achieve modulation and detection, respectively, of a transmitted phonon beam.

14 Claims, 7 Drawing Figures

INVENTORS.
ISAAC F. SILVERA
LAWRENCE A. VREDEVOE
BY Thomas S. MacDonald
ATTORNEY INVENTORS.
ISAAC F. SILVERA
LAWRENCE A. VREDEVOE
BY Thomas S. MacDonald
ATTORNEY

PHONON GENERATION HANDLING AND DETECTION

BACKGROUND OF THE INVENTION

1. FIELD OF THE INVENTION

The present invention relates to high frequency sonic energy beams and more particularly concerns apparatus and methods for generation, amplification, modulation and detection of phonons.

2. DESCRIPTION OF PRIOR ART

Sonic energy has long been employed in a variety of applications, scientific studies, and many types of practical devices. In various arrangements, sonic energy transducers have been employed for measurement and inspection of materials and structures. A beam of sonic energy is transmitted and reflected in different amounts in accordance with gross discontinuities such as, for example, voids in the bonding of a laminated structure. This provides information concerning internal structural aspects that is not readily available by other observation or inspection techniques. Microwave sound waves are beginning to find application in sonic circuits that are analogous in many respects to electrical and fluid circuits. Microwave sonic beams are useful in the study of molecular and atomic structures of materials, their characteristics, and their physics. For example, phonon spectroscopy provides valuable information concerning impurities in a solid body and the relation of such impurities to the host material.

The study of material properties by means of ultrasonic or hypersonic (microwave) sound waves has several advantages over study by other means, such as optical techniques. Because the interaction mechanisms are different, materials that are opaque to electromagnetic waves can be quite transparent to sound waves, enabling one to nondestructively examine the interior of such materials. Furthermore, materials that are optically transparent may have properties such as strains and defects that cannot be observed optically, but can be easily differentiated by high frequency sound waves.

It is of advantage to work with higher frequency sound waves because spatial resolution is limited by the wavelength of the vibration. A 10 GHz microwave with a typical sound velocity of $10^5$ cm/sec has a wavelength limit to the resolution of about $10^{-5}$ cm. At room temperature the use of hypersonic waves is limited to thin samples due to intrinsic attenuation and losses in most materials. These losses are greatly reduced at low temperatures.

Obvious limitations of lower frequency sound sources have resulted in increased interest in devices for generation of microwave phonons in the frequency range of $10^9$ to $10^{12}$ Hz. Quanta of sonic or vibrational wave energy, known as phonons, may be generated by the lattice displacements of a crystal or vibrational motion of ionic impurities of the crystal, or by interaction between these. Phonon generators, and in particular, phonon masers have been studied in paramagnetic systems. For example, C. Kittel, in "Phonon Masers and the Phonon Bottleneck," *Physical Review Letters*, Volume 6, No. 9, dated May 1, 1961, suggests feasibility of use of paramagnetic ions to produce maser action. R. Orbach, in "The Phonon Maser," *Physics Letters*, Volume 15, No. 1, dated Mar. 1, 1965, proposes population inversion by optical pumping of paramagnetic ruby under specified conditions for phonon maser action.

Observations of ultrasonic maser action in paramagnetic systems are described in E. B. Tucker, in "Amplification of 9.3-kMc/sec Ultrasonic Pulses by Maser Action in Ruby", *Physical Review Letters*, Volume 6, No. 10, dated May 15, 1961, and P. D. Peterson and E. H. Jacobsen, in "Maser Amplification of 9.5-Gigahertz Elastic Waves in Sapphire Doped with Divalent Nickel Impurity Ions," *Science*, Volume 164, dated May 30, 1969. However, as compared with paraelectric systems, the paramagnetic systems have a relatively weak coupling of the paramagnetic ion to the lattice. In practice and theoretically, such devices provide less phonon output power. In the paramagnetic system, more of the released energy is electromagnetic than in paraelectric systems.

A paraelectric system, one involving electric dipoles rather than magnetic dipoles as an impurity, has an intrinsic, strong dipole coupling to the lattice which is many orders of magnitude stronger than the coupling of magnetic ions. Further, the relatively long spin-lattice relaxation times of paramagnetic impurities prevents the generation of ballistic pulses of phonons. The low saturation power levels and weak microwave absorption as compared with paraelectric system, reduces maximum power available. For reasons such as these, paraelectric phonon generation is of increased interest. "Paraelectric Heating and Cooling with $OH^-$-Dipoles in Alkali Halides" by U. Kuhn and F. Luty, *Solid state Communications*, Vol. 4, pp. 31–33, 1965, suggests a paraelectric phonon maser that population inversion of certain paraelectric energy levels by a rapid reversal of applied electric field. However, the device suggested by Kuhn and Luty depends upon reversing polarity of a large electric field, in the order of kilovolts, within a time interval that is small compared with the relaxation times of phonons of the energy levels of interest. Such polarity reversals of large electric fields within times less than about $10^{-8}$ seconds are not readily achievable in practical applications.

"Paraelectric Resonance of $OH^-$Dipoles in KCl," by G. Feher, I. W. Shepherd, and Herbert B. Shore, *Physical Review Letters*, Volume $1A_1$, $2A_1$, dated Mar. 21, 1966, discusses paraelectric resonance of hydroxyl dipoles in a potassium chloride crystal, and speculates that saturation of an energy level transition will cause a population inversion analogous to the three level maser. However, the paper by G. Feher, et al., does not show or suggest particular levels of population inversion or power levels, and provides no indication that a useful gain is possible. Without identification of particular levels of population inversion, output frequency of course cannot be identified. A practical operating device cannot be built without a knowledge of the various parameters that are required to achieve operation and use.

The need for a useful phonon detector is recognized by C. H. Anderson and E. S. Sabisky in their article "-Sensitive Tunable Acoustical Phonon Detector," *Physical Review Letters*, Volume 18, No. 7, dated Feb. 13, 1967. Anderson and Sabisky suggest a narrow band phonon detector in the GHz range and employ optical monitoring of spin temperature. Such a device is limited by its required application of an optical beam and in temperature dependence.

Accordingly, it is an object of the present invention to provide a method and apparatus for generation, amplification, modulation, and detection of phonons in a paraelectric system.

GENERAL THEORY

The present invention, as will be readily understood from the following description, is applicable to a wide variety of crystals doped with an electric dipole impurity. Nevertheless, for purposes of exposition and in order to better afford a full and complete understanding of the principles of the invention, it will be described in connection with a potassium chloride-hydroxyl system. In such a system, the $OH^-$ ions substitute for the chlorine ions in the crystal lattice and there is, in effect, a KCl:KOH system.

Tunnelling and librational types of motion of dipolar impurities such as the hydroxyl ion within the alkali halide lattice are controlled by a multiwell crystal field potential that exists at the substitutional lattice site, the side of the impurity ion. For an infinitely high potential maximum, each quantum state of dipole orientation is degenerate in accordance with periodicity of the crystal potential and may be represented by a localized state in a specific direction. For potential barriers of finite value, these localized states overlay thereby afford a small amount of energy level splitting. This is a solid-state tunneling. For the hydroxyl ion in the potassium chloride crystal energy level splittings are in the microwave frequency range for the lowest levels of tunnelling states. The hydroxyl ion impurity possesses energy minimal for orientations of its electric dipole moment along the fixed (100) axes of the KCl host.

Figure 1:
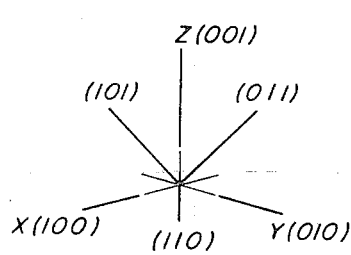
FIG. 1 shows arrangement and identification of axes used to describe the system.

Briefly digressing, it is noted that various axes of the crystal are conventionally identified according to notation shown in FIG. 1 where $x$, $y$, and $z$ identify three mutually orthogonal axes and the axis (001) corresponds to $z$, the axis (010) corresponds to $y$, and the axis (100) corresponds to $x$. To identify axes intermediate to these, the various number symbols are combined so that for example axis (101) identifies an axis lying in the $ZX$ or (001) (100) plane and bisecting the $x$ and $z$ axes. Similarly, the symbol (110) represents an axis lying in the $xy$ plane and bisecting these axes.

Figure 2:
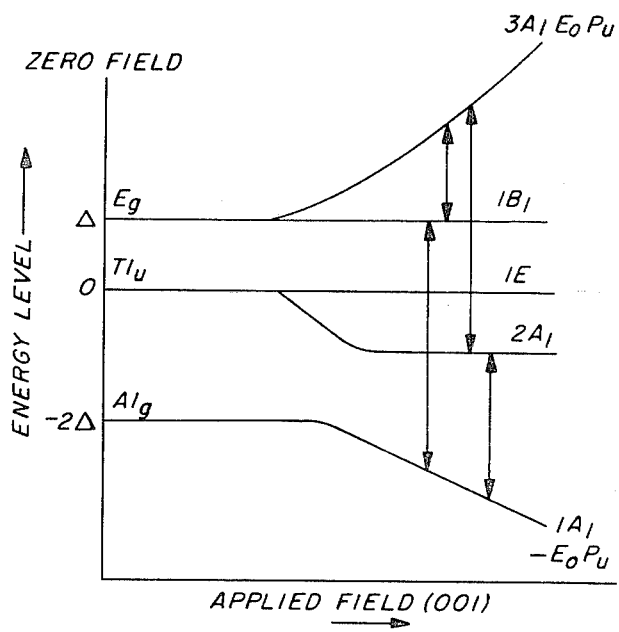
FIG. 2 illustrates zero and applied field electric dipole energy levels in a paraelectric crystal.

To continue, in the absence of an applied dc field, the tunneling states may be expressed as illustrated in FIG. 2 as $E_g$, a doublet state of even parity, $T^u$, a first triplet state of odd parity and $A_{1g}$, a first singlet state of even parity. FIG. 2 illustrates these energy levels as measured along the ordinate in the graph as they vary with application of an applied dc field measured along the abscissa. The field is applied along the (001) axis of an hydroxyl ion doped potassium chloride crystal. As may be seen in FIG. 2, the zero field dipolar energy levels are further split by the application of an external dc electric field, there being different splittings depending upon the axes along which the field is applied. Quantitative values for the tunnelling splitting $\Delta$ of the field states of the hydroxyl ion tunnelling in a potassium chloride lattice, and for the effective dipole moment $P_u$ of the system can be obtained from analysis of the paraelectric resonance of various microwave frequencies as described, for example, in "Tunnelling States of $OH^-$ in KCl Crystals" by W. E. Bron and R. W. Dreyfus, *Physical Review*, Volume 163, No. 2, pp. 304–314, Nov. 10, 1967. Briefly describing such measurement, a specified value of dc field is applied, the doped crystal is subjected to a microwave electric field in a microwave cavity, and both the microwave frequency and dc field magnitude are varied. For any given applied dc field, there is a maximized absorption of microwave energy at a given microwave frequency, due to electric dipole transition between the various energy level states. Thus quantitative values of the energy levels and their variation with applied field may be identified.

As is well known, the various energy levels in a multi-level system generally tend to exhibit decreased numbers of particles, in this case ionic dipoles, in levels of increasing energy. Thus, for a system such as that illustrated in FIG. 2, the lowest level $1A_1$, the ground state, would tend normally to be most heavily populated. Stated in another fashion, the number of dipoles in the ground state, $1A_1$, is normally greater than the number of dipoles in higher energy levels. Further, dipoles in higher energy levels tend to relax or decay into lower energy levels. Relaxation rates for the transitions of dipoles from higher to lower energy levels vary widely in different systems and in different materials. The relaxation rate may be considered to be the average time that it takes for a dipole to go from a higher level to a lower level. In such a transition, the difference in energy is given up as a phonon or a photon.

A significant advantage of use of paraelectric systems for phonon generation resides in the fact that the energy level transitions in such a system yield considerably greater portions of released energy in the form of phonons, whereas in paramagnetic systems, more of the energy released in such a transition is in the form of photons.

In general, there is a tendency for more widely separated energy levels to undergo spontaneous transitions or relaxation more quickly than levels that are closer together in energy. This is supported by calculations of dipole lattice relaxation rates that are in agreement with experiment. Such calculations are based upon assumption of a model in which the center of charge of the hydroxyl ion is displaced from the chlorine ion lattice side by about 0.3 angstroms in the direction of the dipole moment. Such calculations are set forth in "Relaxation of $OH^-$ Dipoles in KCl at Low Temperatures," by Lawrence A. Vredevoe, *The Physical Review*, Volume 153, No. 2 pp. 312–318, Jan. 10, 1967, and show that for the case of (001) dc electric field, the dipole lattice relaxation rates for lower energy transitions, from level $2A_1 \rightarrow 1A_1$ and from level $3A_1 \rightarrow 1B_1$, are significantly slower than those for higher energy transitions $3A_1 \rightarrow 2A_1$ and $1B_1 \rightarrow 1A_1$.

With this model, dipole lattice relaxation times have been calculated using measured values of the hydroxyl dipole moment $P \sim 3.3 \times 10^{-18}$ esu and zero field splitting values of $\Delta \sim 5.5 \times 10^9$ Hz. In the presence of a dc field, $E_0 = 10$ KV/cm parallel to the (001) axis of a potassium chloride host crystal, the calculated dipole lattice relaxation times for a temperature much smaller than the product of applied field and dipole moment are $1.1 \times 10^{-8}$ and $1.3 \times 10^{-7}$ seconds for lower energy transitions from levels $2A_1 \rightarrow 1A_1$ and from level $3A_1$ to level $1B_1$, respectively. These relaxation times are $5.6 \times 10^{-9}$ and $4.2 \times 10^{-9}$ seconds for the higher energy transitions, from level $3A_1$ to level $2A_1$ and from level $1B_1$ to level $1A_1$, respectively. Since relaxation times for such transitions by means of photon emission are in the order of $10^{-6}$ seconds, electromagnetic or photon contribution to these relaxation rates is negligible. With relaxation times as calculated above, the ratio of the dipole lattice relaxation rates $3A_1 \rightarrow 2A_1/2A_1 \rightarrow 1A_1$, and the ratio of relaxation rates $1B_1 \rightarrow 1A_1/3A_1 \rightarrow 1B_1$ are 2 and 3.2, respectively.

Accordingly, it will be seen that if level $3A_1$ is provided with a high population density whereby the various transitions identified above may occur at the identified decay rates, the ratios 2 and 3.2 would result in two population inversions. A first inversion occurs between $3A_1$ and $1B_1$ states and a second between $2A_1$ and $1A_1$ states. This is analogous to the three level maser described in "Proposal for a New Type Solid State Maser" by N. Bloembergen, *Physical Review*, Volume 104, No. 2, Oct. 15, 1956. For example, with maximized population density in level $3A_1$, the decay rate to level $1B_1$ is relatively slow, whereas decay rate from level $1B_1$ to ground state level $1A_1$ is relatively fast. Thus, level $1B_1$ becomes depopulated more rapidly, whereas level $3A_1$ retains a higher population, resulting in a population inversion wherein the population of $3A_1$ is greater than that of level $1B_1$. Similarly, since the decay rate from $2A_1 \rightarrow 1A_1$ is less than the decay rate from $3A_1 \rightarrow 2A_1$, there results an increase in population of level $2A_1$ with respect to population of $1A_1$, to achieve a second population inversion.

In the presence of relatively large dc electric fields, in the order of or greater than 6 KV/cm parallel to the (001) axis, energy (and, therefore, frequency) of phonons produced in transition between the two pairs of inverted levels are equal (although power is greater for the $3A_1 \rightarrow 1B_1$ transition). This transition energy is proportional to the applied field $E_0$. In other words, as the applied field $E_0$ is increased, the energies of the transitions will increase. Thus for dc electric field in the range of about 6 to 50 KV/cm, the emitted phonon energy can be varied (tuned) from about $10^{10}$ to $10^{11}$ Hz.

Energy level transitions in the presence of a (001) dc electric field, reveal another significant aspect of these non-radiative (phonon) transitions. As described in the paper by Vredevoe identified above, these relaxation processes are dominated by phonons with lowest velocity. There is also an angular dependence in the relaxation mechanism that favors certain axes. Accordingly, it is found that the $3A_1 \rightarrow 2A_1$ and the $2A_1 \rightarrow 1A_1$ transitions couple most strongly to transverse phonons that are propagating parallel to the (101) or (011) axes. The $3A_1 \rightarrow 1B_1$ and the $1B_1 \rightarrow 1A_1$ transitions are found to couple most strongly to transverse phonons propagating parallel to the (110) axis. Transverse phonons are vibrations in shear, occurring perpendicular to the direction of propagation of the acoustic wave. Except for the effects of anharmonicity and other decay mechanisms, the dipolar energy that is lost in the above-identified transitions is selectively pumped into transverse phonons that are propagated parallel to the (110) axis of the cubic crystal.

Thus, it will be seen that given a suitably dense population of the upper level $3A_1$, a pair of population inversions will occur, resulting in transitions that yield energy into transversely propagated phonons.

It has been shown in "Microwave Saturation of Paraelectric-Resonance Transitions of OH$^-$Ions in KCl," by L. D. Schearer and T. L. Estle, *Solid State Communications*, Volume 4, pp. 639–642, 1966, that the $1A_1 \rightarrow 3A_1$ transition can be saturated at relatively low microwave powers in the presence of a 3KV/cm dc field at a temperature of 1.3° K. For larger dc fields, the pumping power required to saturate this transition is larger. For example, microwave powers on the order of 1 watt are needed to be supplied to a $TE_{102}$ cavity with a loaded Q of 4,000 in order to saturate the $3A_1$ level in a dc field of 10 KV/cm at 1° K.

Accordingly, combining the fact that significant microwave pumping to the $3A_1$ level is possible, with the ratios of decay rates described above, and solving the rate equations for the system, enables design and construction of apparatus for tunable and directional phonon amplification via stimulated emission of transverse phonons along the (110) axis of the paraelectric system.

Amplification of propagated phonons can be enhanced along a given (110) axis by preparing the corresponding surfaces (normal to this axis) of the excited doped crystal flat and parallel, to enhance elastic reflection of the (110) axis phonons in a Fabry-Perot geometry. As well known, Fabry-Perot geometry employs multiple reflections between facing internal surfaces to afford enhancement of the propagated signal. The generated phonons belonging to the lowest or transverse branch of the phonon spectrum also possess anomalously long lifetimes insofar as anharmonic decay is concerned, thus still further enhancing buildup of phonon population in these particular modes of transverse propagation.

A particular example of required pumping rate to achieve population inversion between $3A_1$ and $1B_1$ levels of an exemplary system may be calculated as described below.

Solution of the equations for relaxation rates of the system for temperatures at which $kT$ is small compared with the filed splitting, $\Delta$, of the dipolar levels shows that the steady-state pumping power required to produce population inversion between the $3A_1$ and $1B_1$ levels is less than that needed to produce inversion between the $2A_1$ and $1A_1$ levels. ($k$ is Boltzmann's constant and T is temperature in degrees Kelvin.) For population inversion between these levels it is required that the population ratio, $$\frac{N_{3A_1}}{N_{1B_1}},$$

be greater than unity in the presence of large dc fields (where $E_o$ is greater than about 6 KV/cm). In order to obtain such an inversion, it is calculated that the pumping rate must be as given in equation (1). The pertinent equations are set forth at the end of this specification. For this calculation, it is assumed that the pumping rate is sufficiently large relative to the dipole lattice relaxation rates, that the phonons created in the active modes will not appreciably alter effective temperature of these modes from that of the lattice during the period it takes to achieve the inverted population. Pumping rates required by equation (1) increase strongly with temperature, thus making it advantageous to work at as low a temperature as possible.

PHONON GENERATOR

A specific example is considered wherein a 10 KV/cm dc electric field is applied parallel to the (001) axis of a potassium chloride crystal doped with an hydroxyl ion. The crystal is located in the electric field of a $TE_{102}$ microwave cavity. Confocal or re-entrant microwave cavities may also be employed to provide the benefits of higher Q and increased electric field for a given power input, and larger sample area. The resonance frequency for the pumping transition from level $1A_1$ to level $3A_1$ in this example is 35 GHz. For a lattice temperature of 1° K, a microwave pumping power of 500 milliwatts supplied to the cavity produces a 12 percent inversion between the $3A_1$ and $1B_1$ states. If the lattice temperature could be maintained at the 0.5° K, a pumping power of only 180 milliwatts would be required to the cavity to produce this 12 percent population inversion between these states. Thus, advantages of working at lowest possible temperature are apparent. In any event, crystal lattice temperatures that are significantly above these low levels will cause temperature induced vibrations of the lattice that significantly mask any desired single frequency phonon propagation.

The "gain" for the above-described phonon emission and amplification system indicates that significant phonon powers are generated even with a relatively small amount of electrical dipole impurity in the the host crystal. Gain is calculated in a manner analogous to that used for calculation of the gain of an optical maser. Assuming a Lorentz line shape for the strain broadened dipolar levels, there is derived an expression for gain (in the presence of large dc fields) for phonons generated by the $3A_1 \to 1B_1$ dipole lattice relaxation transition. The strongest contribution to the gain is obtained with the phonon-dipole coupling terms that arise from displacement (from the centrosymmetric site) of the center of charge of the dipole in the direction of its polarization. This non-centrosymmetric contribution to gain is set forth in equation (2).

Although the above-described phonon emission and amplification can be achieved with various types of impurity doped crystals, the latter frequency exhibit a strong inhomogeneous strain broadening of the dipolar levels. Such strain broadening will result in an increased band width of the desirably narrow, monochromatic phonon beam that is generated. Accordingly, to minimize such bandwidth and to limit the strain broadening of dipolar energy levels, it is preferred to employ crystals having minimal internal stress, such as for example, doped crystals that are annealed as described in "Paraelectric Resonance of Annealed KCl:KOH Crystals" by R. W. Dreyfus, *Solid State Communications*, Volume 7, pp. 827-829, 1969.

For such annealed crystals, and using a half-width of observed dipolar transition of $\delta\nu \sim 6 \times 10^9$ Hz, equation (2) indicates a gain of about $\alpha = 7.4$ cm$^{-1}$. Such a gain is yielded by an hydroxyl ion concentration of KOH/KCl = $10^{-6}$, or one part per million, and a dc field $E_o = 10$KV/cm. Frequency of the $3A_1 \to 1B_1$ transition is 12 GHz. This gain is achieved at a crystal temperature of 1° K and employing 500 milliwatts of microwave of pump power. For temperature of 0.5° K and 180 milliwatts of pump power, the gain would be 4.5 cm$^{-1}$.

It should be observed that the above-identified gains are for an hydroxyl ion impurity concentration of the relatively low level of one part per million. The described mechanism of phonon generation is dependent upon the total number of hydroxyl ions involved, whereby increased concentrations will increase the phonon power that is produced. Accordingly, impurity concentrations of up to 10 or 20 parts per million will provide 10 to 20 fold increase in the identified gains. Concentrations of hydroxyl ion of up to 100 parts per million are possible with alkali halide crystals. However, for concentrations beyond about 10 parts per million the mechanism of phonon generation begins to be modified somewhat. At greater impurity concentration, the individual dipole ions no longer are sufficiently separated to allow their actions to be considered relatively independent of each other. For such greater concentrations, the phonon emission mechanism is changed by the actual interaction between adjacent impurity ions.

Figure 3:
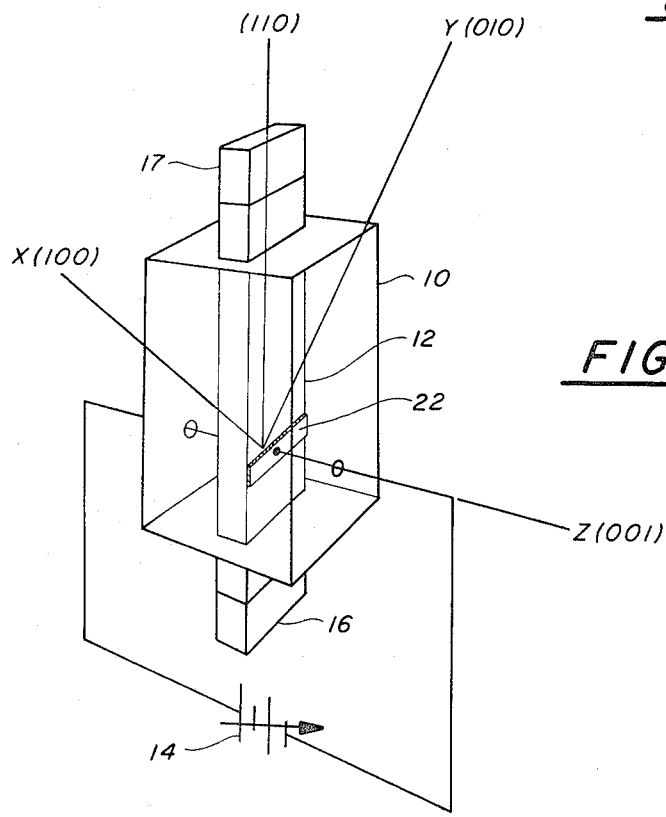
FIG. 3 illustrates a geometrical relation between crystal axes, applied field and polarization directions in a phonon generator, and maser constructed according to the principles of the present invention.

Illustrated in FIG. 3 is a schematic arrangement of a phonon emitter constructed in accordance with principles described above. A tuned microwave cavity 10 has suitably mounted therein for exposure to the electric field of the cavity, a paraelectric crystal 12 of the type previously described. Cavity 10 is excited via a microwave source such as a klystron and wave guide (not shown in this figure) at the frequency (such as 35 GHz) of the transition between levels $1A_1$ and $3A_1$ of the dipole impurities. A dc field from a variable source 14 is applied to the crystal 12 in the direction of the Z or (001) axis of the crystal. The entire arrangement (except, the several power supplies) is cooled to a temperature of about 1° K, as by immersion in a bath (not shown in this figure) of liquid helium, for example. Thus, when the illustrated crystal is pumped with microwave frequency and subjected to a dc field along the (001) axis, there occurs an emission of transverse phonons at the frequency corresponding to the $3A_1 \to 1B_1$ transition, and propagated along the (110) axis.

A suitable vibrational energy coupling device such as for example a solid sapphire rod or bar 16 has an end thereof mounted in close abutment with the end of crystal 12 for coupling the phonon beam from the generating crystal. The generating crystal 12 extends from and beyond the microwave cavity. The coupling bar 16 extends from its abutment with crystal 12 from and beyond the cooling bath, so as to allow coupling of the phonon beam to an output device that is at some higher temperature. Further details of arrangement and application of this phonon generator are described below in connection with FIGS. 5 and 6.

When used as a phonon generator, phonons may be released in transitions between the identified inverted population levels by a spontaneous reaction. In addition, for a maser type of action, the relaxation or transition between inverted population levels is employed to amplify a relatively weak existing microwave sonic vibration. Thus, an input vibration propagating along the (110) axis at the frequency corresponding to the transition between the inverted population levels $3A_1$ and $1B_1$, for example (12GHz with an applied dc field of 10 KV/cm), may be applied to and significantly amplified by the phonon maser described herein. Such an input vibration that is to be amplified may be applied via a suitable sonic energy coupling rod 17, similar to rod 16 (FIG. 3) and fixedly mounted in close abutment with the end of paraelectric crystal 12 that is remote from coupling rod 16. The upper end (as shown in FIG. 3) of crystal 12 is preferably within the microwave cavity. However, for use with the input energy coupling rod 17, this upper end extends out of the cavity for connection with the coupling rod. Thus, a weak sonic energy signal is applied at one end of the paraelectric crystal 12, is amplified by stimulated emission, and is provided as an output of increased phonon power by the output coupling device 16.

PHONON DETECTION

In the presence of a dc field that polarizes the dipole impurities of the paraelectrical crystal, absorption of phonons by an unpumped system will achieve a concomitant dielectric depolarization. Such depolarization may be conveniently used for detection of received resonant phonons. The strong dipole lattice coupling in the hydroxyl doped potassium chloride crystals results in a large absorption coefficient, or negative gain, for phonons resonant with certain energy levels in an unpumped system. For example, in the presence of a strong dc electric field (where the product of the field strength and dipole moment is much greater than the zero field splitting, $\Delta$, and where the field is parallel to the (001) axis) the $1A_1$ ground state of the system is a state in which the hydroxyl dipole moment is oriented parallel to the dc field. In such a system, however, dipoles in $2A_1$ and $1B_1$ intermediate states have the dipole moments thereof oriented perpendicular to the applied dc field. This may be observed from the wave functions of the phonons as set forth in equations (3), 4) and (5) below. Equation (5), for ground state $1A_1$, indicates that the coefficient of the Z axis vector is unity, whereas the coefficients of the X and Y axes vectors are considerably less than unity. Likewise, equation (3) for the wave function of state $1B_1$ indicates a zero Z axis vector and a substantially equal distribution along X and Y axes. Equation (4) for state $2A_1$, indicates a substantially greater distribution in X and Y (by virtue of the coefficient one-half) than in the Z axis direction which terms have coefficients considerably less than one-half. These differences in dipole moment orientation in the several states shows that as microwave phonons in resonance with the $1A_1 \rightarrow 2A_1$ or with the $1A_1 \rightarrow 1B_1$ transitions are strongly absorbed, the polarizability and the net polarization in the presence of the dc field are significantly reduced. This reduction in polarizability of the paraelectric crystal is employed as a tunable and amplitude sensitive detector of microwave phonons.

Figure 4:
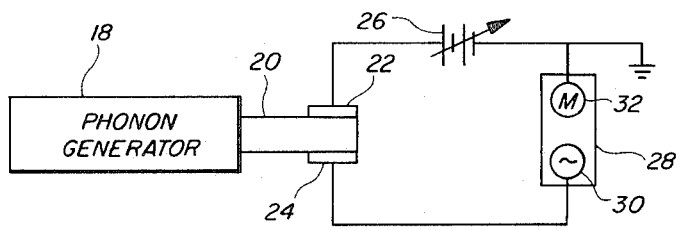
FIG. 4 illustrates a phonon detector.

A measure of the variation of polarizability or of the actual decrease in polarization, in the presence of an applied dc bias field is achieved by making a differential capacitance measurement of the paraelectric crystal, using the crystal as the dielectric of a capacitor. As illustrated in FIG. 4, a phonon generator or source of phonons of undetermined power and whose presence, power and frequency are to be observed and detected, is arranged to couple its phonon beam into paraelectric crystal 20 of the type described above, such as for example, the potassium chloride material doped with an hydroxyl dipole impurity. Electrically conductive plates 22, 24 are positioned adjacent to and in contact with opposite sides of the paraelectric crystal to provide a dc bias field that is generated by a variable dc source 26. A differential capacitance detector 28 is series connected with the plates 22, 24 and source 26. The differential capacitance and detector comprises an ac source 30 and a meter or oscilloscope 32 connected in series in the illustrated circuit.

When no phonons resonant at the frequency determined by the magnitude of applied dc field are received by the crystal 20, substantially all of the dipole moments are oriented in the direction of the field. In a system analogous to that shown in FIG. 3, this direction is along the Z axis, for example. The differential capacitance detector 28 provides a reading of the capacitance between plates 22, 24, having the relatively polarized dielectric of crystal 20 therebetween. Now consider generation of a beam of phonons resonant at the $1A_1 \rightarrow 2A_1$ or $1A_1 \rightarrow 1B_1$ transition of the doped crystal 20 for a particular value of the applied dc field. As such resonant phonons are absorbed, a continuous stream of dipoles are raised from the ground state $1A_1$ to state $2A_1$ or $1B_1$. In either of these higher energy level states, the dipole moment is normal to the dc field rather than aligned therewith as in the ground state. Accordingly, there is a net decrease in polarization of the crystal 20 in the direction of the applied dc field. Since the polarization of the capacitor dielectric is changed, the capacitance detected by the differential capacitor 28 is also changed by an amount that is related to the power of absorbed phonons.

To detect phonons of a different frequency, the magnitude of applied dc field is varied to a value that provides a transition frequency between ground state and $2A_1$ or $1B_1$ of the desired magnitude.

Like the phonon emitter, the detector operates only at temperatures that are exceedingly low compared to the resonance energy, whereby the population factors $N_{1A_1} - N_{2A_1}$ and $N_{1A_1} - N_{1B_1}$ are maximized. Under such low temperature conditions, the impurity bulk polarization for hydroxyl concentration of 1 part per million is as set forth in equation (6) below. Equation (6) relates to the case of resonance with the $1A_1 \rightarrow 2A_1$ transition.

The above described arrangement for phonon detection may be applied conveniently for detection of phonon amplification by stimulated emission, by observation of line narrowing, that is, observation of the decreased bandwith of the maximized or peak absorption that is detected. For such an arrangement, the phonon generator 18 is arranged as illustrated in FIG. 3 and the doped crystal 20 may be a single continuous crystal arranged as illustrated in FIG. 3 to emit phonons at one end thereof within a pumped microwave cavity. The same crystal, for such arrangement, has the other end thereof extending from the microwave pumped cavity for phonon detection in the manner illustrated in FIG. 4.

APPLICATION

Figure 5:
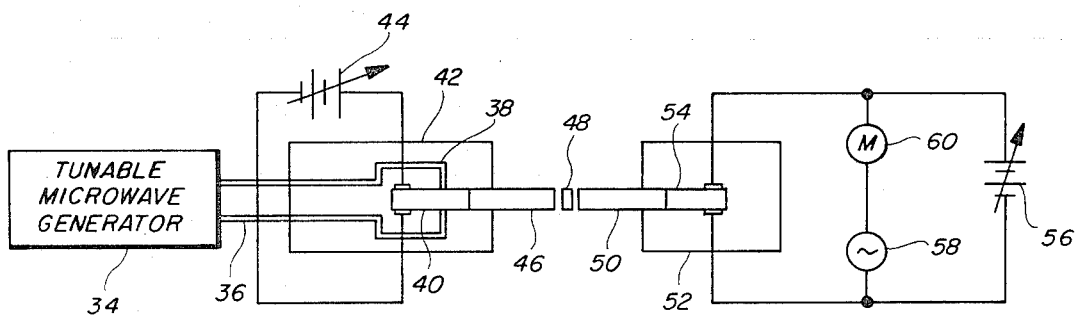
FIG. 5 shows an arrangement for application of the phonon generator and detector of the present invention to observation of a sample material.

Illustrated in FIG. 5 is an arrangement of phonon generator and phonon detector constructed in accordance with principles of the present invention, adapted for observations on a sample material. A tunable microwave generator, such as a tunable klystron 34, has the microwave energy thereof coupled via a wave guide 36 to provide an electric field to a tunable microwave cavity 38 in which is mounted a paraelectric phonon generating crystal 40. The microwave cavity and crystal are suitably cooled, as to temperature of liquid helium, for example, by a surrounding cooling chamber 42. A variable dc source 44, providing a field in the order of 10 KV/cm, is coupled to electrically conductive plates affixed to opposite sides of one end of crystal 40 within the microwave cavity.

The klystron microwave generator 34 and cavity 38 are both tunable and both actually tuned to provide pumping power at a frequency determined by the transition between states $1A_1$ and $3A_1$ for the crystal 40 in the presence of a dc field of a given magnitude. The dc field may be varied in order to tune the frequency of the output phonon beam. As can be seen in FIG. 2, variation of the dc field of source 44 will vary the energy level difference between the population inversion states $3A_1$ and $1B_1$ whereby the phonons emitted in transition between these levels will vary in frequency in accordance with the variation of the magnitude of applied dc field. In a typical example, the paraelectric crystal 40 may be in the order of several centimeters in length and about one-half by one-fourth cm in transverse dimensions.

A suitable sonic energy coupling device in the form of a rod of sapphire 46 has a cross-sectional dimension substantially the same as that of the paraelectric crystal 40 and has an inner end thereof in close abutment with an end of the paraelectric crystal 40. Preferably, mating ends of the crystal and sapphire rod are carefully ground and polished for maximum surface contact and are suitably joined by one of a number of well known adhesive materials. For example, a material known as Barfaq, which is a viscous paste at room temperature, may be coated on the mating surfaces and is solid at liquid helium temperatures to thereby fixedly mount the sapphire rod to the paraelectric crystal. Sapphire is a preferred material for the sonic coupling rod because it exhibits low attenuation and scattering of phonons propagating through the temperature gradient that is presented between the cooled crystal and higher temperatures.

The rod 46 may be of circular cross-section or may be of a thin strip, preferably of at least a millimeter in diameter, and having a length of as much as several inches. Minimum diameter of the coupling rod 46 is not limited by frequencies, since wavelength of phonons at frequencies in the order of $10^9$ to $10^{11}$ Hz are considerably smaller than any feasible minimum rod diameter. Preferably, the rod diameter should be sufficient to adequately conduct a phonon energy beam with minimum loss and yet provide a minimal thermal path to the cold crystal.

It is noted that the coupling rod 46 preferably extends out of the environmentally cooled chamber 42 from its junction therein with the crystal 40 for convenient connection to a sample that may be at room temperature. Thus, the outer end of energy coupling rod 46 may be placed in close contact with a sample 48 that is to be subjected to the microwave phonon beam. Phonon vibrations propagated through sample 48 are received by a second sonic energy coupling rod 50, which may be identical to the rod 46. Rod 50 extends into a second cooled chamber 52 in which is mounted a phonon detector of the type illustrated in FIG. 4. The detector comprises a second paraelectric crystal 54 having dc electric field applied thereto by a variable source 56 and including a differential capacitance detector formed by an ac source 58 and a meter 60.

Figure 6:
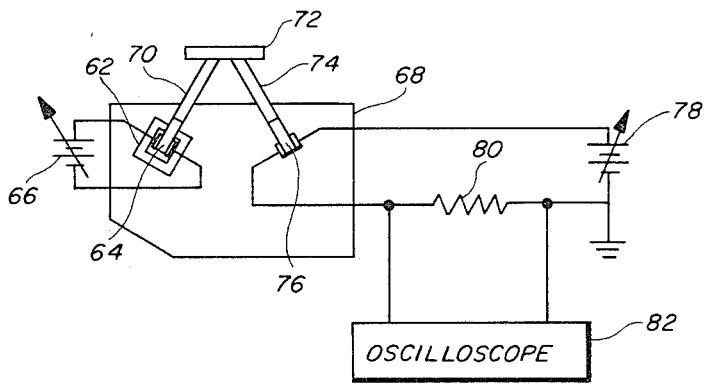
FIG. 6 shows an alternate arrangement of phonon generator and phonon detector.

It will be readily appreciated that a variety of modes of application of a phonon beam to a material to be observed may be achieved. Thus, the sonic energy of the phonons may be either transmitted through the sample, may be refracted by the sample, or may be reflected from the sample. An arrangement involving the latter situation is illustrated in FIG. 6. A phonon generator comprises a microwave cavity 62, carrying a paraelectric crystal 64 that is excited by a variable dc field provided by a source 66. The cavity is fed with a suitable microwave pumping energy by a microwave source and wave guide (not shown). The generator is mounted within a cooled chamber 68 and includes a sonic energy coupler such as a sapphire coupling rod 70 fused to an end of the paraelectric crystal 64 and extending therefrom externally of the chamber 68.

The free end of coupling rod 70 is adapted to be contacted by the surface of a sample material 72 that is to be observed by the manner of its reflection of phonons. Phonons reflected from the sample 72 are coupled to a second coupling rod 74 in contact with another area of the sample 72. Coupling rod 74 extends into the cooled chamber 68 and has its inner end fused or otherwise maintained in close contact with the end of a second paraelectric crystal 76 that is arranged according to principles of this invention to operate as a phonon detector.

The phonon detector illustrated in FIG. 6 employs a slightly modified arrangement for detecting absorbed phonons by means of depolarization of the paraelectric crystal. This crystal is also subjected to a dc field supplied by a variable source 78 along its (001) axis, for example. Again, the paraelectric crystal is employed as the dielectric between the plates of a capacitor that is provided with a dc bias by source 78. Upon receipt of phonons transmitted by coupling rod 74, the dipolar states of impurities of crystal 76 undergo a transition between ground state and $1B_1$ or $2A_1$ states. Thereupon, the change in polarization, P, effects a release of a surface charge $A\delta P$, where A is the capacitor surface area. In effect, there is an electric current thereby provided through a resistor 80 that is series connected with the capacitor. A voltage is generated across the resistor substantially equal to $AR\delta P/t$, where $R$ is the resistance of the resistor 80 and $t$ is the lifetime of the excited dipolar states. The voltage across resistor 80 may be observed on an oscilloscope 82 as a function of the electric field applied by source 78. Magnitude of the voltage determines received phonon power and magnitude of applied field determines received phonon frequency.

Another manner of using polarization change of the crystal in accordance with phonon absorption is based upon reaction of the net polarization of the paraelectric crystal with an external dc electric field perpendicular to the axis of polarization. Such reaction generates a torque between the paraelectric crystal and the applied external field. Depolarization of the paraelectric crystal decreases the value of the torque to thereby provide a measure of received phonon power.

MODULATION

Figure 7:
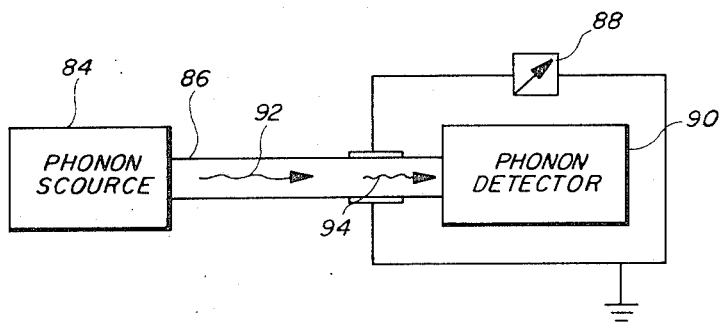
FIG. 7 illustrates a phonon power modulator.

Since the resonant absorption of phonons involves inducing dipolar energy transitions, variation of the applied dc field to change or control such transitions may be employed for modulation of phonon beam power. As illustrated in FIG. 7, a source of phonons 84 which may be substantially identical to that illustrated and described in connection with FIG. 3, causes propagation of a generated phonon beam along the (110) axis of a paraelectric crystal 86 of a type previously described. A variable dc source 88 is arranged to provide a controllable dc field along the (001) axis of the crystal 86. A phonon detector 90 of the type illustrated in FIG. 5 or 6 is sonically coupled with an end of the doped crystal remote from the source of phonons.

As previously described, the energy splittings of the dipolar states are varied by a variation of the magnitude of applied dc electric field whereby phonons are resonantly absorbed by the crystal upon application of a field from source 88 in accordance with the particular dipolar energy transition. The absorption coefficient for this process is large. In the particular case of the hydroxyl doped potassium crystal described herein, for the transition from $1A_1 \rightarrow 2A_1$ levels, the coefficient of absorption of phonons at resonance is as identified in equation (7) below. For an impurity concentration of $10^{-7}$ at a temperature of $1.5°0$ K. and a resonance phonon frequency of $2 \times 10^{10}$ Hz there is a population difference $N_{1A_1} - N_{2A_1} = 1.4 \times 10^{15}$ cm$^{-3}$, and an absorption coefficient $\alpha = 1,100$ cm$^{-1}$.

As illustrated in FIG. 7, phonons from source 84 are generated as indicated by arrow 92 and are attenuated in passing through the applied dc field to provide a diminished phonon beam as indicated by arrow 94. If the applied dc field is at the proper value, the $1A_1 \rightarrow 2A_1$ transition is in resonance with the frequency of propagated phonons and the phonons are resonantly absorbed. If the applied dc field is at some other value, phonons will pass through the field with intrinsic losses only. As the applied dc field is varied resonant absorption of the phonon is concomitantly decreased.

Response of the illustrated modulator is high, its speed being determined only by the pump rate and relaxation times between the dipolar levels indicated. The pump rate depends upon the phonon power since it is the latter that raises the dipoles from $1A_1$ state to $2A_1$ state. Relaxation time is on the order of 10 nanoseconds. As previously described, operation is most efficient at temperatures of liquid helium.

The use of the hydroxyl ion as the dipole impurity is the identified alkali halide is preferred since this impurity ion has the largest intrinsic dipole and accordingly exhibits the strongest lattice coupling. This dipole is more likely to give up energy by phonon emission, as distinguished from photon emission. Thus, the nonradiative energy emitted is maximized with this type of impurity in a paraelectric crystal. Nevertheless, it will be readily appreciated that any of the other alkali halides may be employed as host crystals.

The strongest paraelectric ions are OH$^-$, CN$^-$, O$^-_2$, and Li$^+$. Of these the first three can be easily doped into any of the monovalent alkali halide crystals where the paraelectric ions substitute for the anions of the host. The last ion (Li$^+$) replaces the cation of these crystals. The hydroxyl (OH$^-$) ion has the strongest dipole moment relative to the rest, and therefore possesses the strongest coupling to the lattice vibrations of the highly polar alkali halide host. Preferred alkali halides to use with OH$^-$ (from stability, size compatibility, and polarity considerations) are KCl, NaCl, KBr, NaBr, LiCl, and LiBr.

The particular energy level notation used herein applies to systems where the dipoles have preferred alignment along the (100) axes. Such systems include OH$^-$ impurities with any of the alkali halides except KI and CN$^-$ impurities with any of the alkali halides.

UTILIZATION

The microwave phonons produced at low temperatures in the above-described tunable masing action in paraelectric doped alkali halide crystals (such as KCl:OH$^-$) have their simplest application in low temperature phonon spectroscopy. Since many phonon interactions are most easily studied at low temperatures, it is advantageous to have a source operating in this temperature region. Typical applications that are useful in this respect are the direct study of the interaction between defect states and phonons, the determination of the location of point defects in materials at low temperatures, and low temperature phonon microscopy. For cases where the phonon coupled effects can be examined in the alkali halide hosts (e.g., some phonon defect ion interactions), the phonons can be generated in one region of the sample and interact in another, without the necessity of tranversing any boundary between the sample and source. Point defects in the structure of materials can be located by the reflection of microwave phonons, similar to the "supersonic" reflectoscope used at ultrasonic frequencies. The high frequency microwave acoustic phonons would provide much higher spatial resolution, however.

It has been observed that absorption and reflection of ultraviolet and other electromagnetic radiation by paraelectric ions is significantly affected by their orientation. Thus, propagation of a phonon beam through a material having a surface formed of the described paraelectric crystal will depolarize the surface in different amounts in accordance with the intensity of the phonon beam propagating through the material. The polarization, and thus the rate of phonon incidence, may be inspected by observation of absorption (reflection) of ultraviolet radiation to thus visually display phonon field distribution. As is well known, propagation of sonic energy beams through a structure is affected by discontinuities, impurities, and inhomogeneities, all of which may thus be observed under ultraviolet radiation. Further, refraction, reflection and transmission of light beams to, through, or from a given material may vary in accordance with vibration of the material structure since the effect of the material on a light beam is perturbed by vibration. Thus, a material subjected to a phonon beam would exhibit increased vibration where coupling of the lattice element is weaker, thus resulting in an increased scattering of transmitted light. Such an arrangement enables visible detection of relatively soft and hard parts of crystals.

The present invention may be employed as previously described for use in phonon spectroscopy and furthermore may find application in phonon microscopy. The "illumination" of a subject sample with sound energy will enable observation of features and detail that cannot be detected by either optical or electron microscopes. For example, light may directly kill certain living organisms, or the required staining process may be fatal. Monochromatic, high frequency phonon beam accordingly will provide high resolution observations not otherwise possible.

In a proposed 10 GHz phonon microscope operating at room temperature one of the difficulties encountered is the conversion of the phonon output into a visual display. As previously mentioned, the phonon excited paraelectric levels of a paraelectric crystal change the polarization of the crystal and the absorption of ultraviolet light. The detector of this invention may be used as a visual display transducer operating at low temperatures. For this application a paraelectric crystal is used as a screen for the diffracted phonons in a phonon microscope. Ultraviolet light is swept across the paraelectric screen in a raster. The detected ultraviolet light signal can then be displayed on a video screen. Transmission will vary across the paraelectric screen according to the intensity of phonons at a given point on the screen. This ultraviolet light when converted to a video-image then provides an optical image of the phonon "picture."

Applications of microwave phonon generators and amplifiers in microsound circuits (delay lines, hybrid couplers, magneto-acoustic phase shifters, microsound amplifiers, and the like) are also contemplated. Again, the simplest applications will be to systems operating at low temperatures.

The tunable paraelectric microwave phonon detector is most readily employed in systems for measurement of direction, intensity, and frequency of microwave phonons. For example, a detector may be used for microwave phonon defect detection, visualizing structures in phonon microscopy, microsound circuit detectors, and the like.

There have been described details of a phonon emitter, amplifier, modulator, and detector employing paraelectric crystals of paraelectric ion doped alkali halides and wherein significant gain is achieved with reasonable values of pumping power and applied dc field. Specific values of power, frequency, field magnitude and population inversion levels are identified to exemplify novel structure and arrangement of the described method and apparatus.

The foregoing detailed description is to be clearly understood as given by way of illustration and example only, the spirit and scope of this invention being limited solely by the appended claims.

EQUATIONS (1)
$$\Gamma_p > \frac{4.5 \times 10^7 (\epsilon^2 - 1) \left\{ \frac{\left[\exp\left(\frac{\epsilon}{2T}\right) - 1\right](\epsilon+1)^5}{[(\epsilon+1)^5 - (\epsilon-1)^5]\left[\exp\left(\frac{\epsilon+1}{4T}\right) - 1\right]} - 1 \right\}}{(\epsilon+1)\left[\exp\left(\frac{\epsilon-1}{4T}\right) - 1\right] + (\epsilon-1)\exp\left(\frac{\epsilon-1}{4T}\right)\left[\exp\left(\frac{\epsilon+1}{4T}\right) - 1\right]} \text{ sec}^{-1}$$

where $$\epsilon = \frac{E_o P_u}{\Delta}$$

$T$ is lattice temperature, $E_o$ is applied dc field, $P_u$ is $OH^-$ dipole moment and $\Delta$ is zero field energy level splitting.

(2) $$\alpha(\nu) = \frac{13 e^2 P_u^2 \Delta (\epsilon - 1)}{\hbar^2 p v_t^3 a^4 \delta\nu (\epsilon+1)^2} \left[\frac{r_e}{a}\right]^2 (N_{3A_1} - N_{1B_1})$$

where $e$ is the electronic charge, $P_u$ is the hydroxyl dipole moment, $\Delta$ is the zero filed splitting $p$ is the crystal density, $v_t$ is the velocity of the generated transverse phonons, $a$ is the lattice constant, $r_e$ is the displacement of the center of charge of the dipole from a centro-symmetric site. $N_{3A} - N_{1B}$ is the population (density) difference between the $3A_1$ and $1B_1$ states (which is given by a solution of the rate equations and depends upon the pumping rate), $\hbar$ is Planck's constant, and $\delta\nu$ is the half-width at half-maximum of the $3A_1 \to 1B_1$ resonance.

(3) $\psi_{1B_1} = (\frac{1}{2})[|x\rangle + |-x\rangle - |y\rangle - |-y\rangle]$ (4) $\psi 2A_1 = (\frac{1}{2})[|x\rangle + |-x\rangle + |y\rangle + |-y\rangle]$ $$-\frac{\Delta}{x-\Delta}\Big|z\rangle + \frac{\Delta}{x+\Delta}\Big|-z\rangle$$

(5) $\psi 1 A_1 = |z\rangle + \frac{\Delta}{2(x+\Delta)}[|x\rangle + |-x\rangle + |y\rangle + |-y\rangle]$ where $$x = E_o P_u \text{ and } E_o \gg \frac{\Delta}{P_u}.$$

(6) $$P = 6.6 \times 10^{-2} \left(1 - \frac{\Gamma^i 1A_1 \to 2A_1}{\Gamma 2A_1 \to 1A_1}\right) \text{ esu/cm}^3$$

where $\Gamma^i 1A_1 \to 2A_1 / \Gamma 2A_1 \to 1A_1$ is the ratio of the signal induced excitations to the spontaneous relaxation.

(7) $$\alpha(\nu_o) = \frac{117 c^2 p_u^2 \Delta}{\hbar^2 p v_t^3 a^4 \delta\nu (\epsilon - 1)} \left(\frac{r_e}{a}\right) (N_{1A_1} - N_{2A_1})$$

We claim:

1. A phonon emitter comprising
an alkali halide crystal having electric dipole impurities,
   means for subjecting the crystal to a dc field sufficient to enable said impurity to assume energy levels $1A_1$, $2A_1$, $1B_1$, and $3A_1$,
      said impurity having a rate of decay from level $3A_1 \rightarrow 2A_1$, greater than its rate of decay from level $1A_1 \rightarrow 1A_1$, and a rate of decay from level $1B_1 \rightarrow 1A_1$, greater than its rate of decay from level $3A_1 \rightarrow 1B_1$,
   a pumping means for applying energy to said crystal at a frequency to raise said impurity to said $3A_1$ level,
      said pumping means including means tuned to the frequency of the 1A to 3A transition and further including means providing pump power for achieving a population inversion of one of a pair of transitions comprising
   a first transition between levels $3A_1$ and $1A_1$, and a second transition between levels $2A_1$ and $1A_1$, and
      means for stimulating emission of transverse phonons of the frequency of said one transition comprising means for enhancing repetitive reflection of phonons of the frequency of said one transition along a predetermined axis of said crystal, and utilization means responsive to phonons at the frequency of said one transition and propagated along said predetermined axis.

2. The emitter of claim 1 wherein said crystal and impurities are selected from the group consisting of OH⁻ impurities with any one of the alkali halides excepting KI, and CN⁻ impurities with any one of the alkali halides.

3. The emitter of claim 2 wherein said dipole is an hydroxyl ion.

4. The emitter of claim 3 wherein concentration of said ion in said crystal is in the range of 1 to 10 parts per million.

5. The emitter of claim 3 wherein said crystal is an alkali halide selected from the group consisting of KCl, NaCl, KBr, NaBr, LiCl, and LiBr.

6. The emitter of claim 5 wherein said alkali halide is potassium chloride.

7. The emitter of claim 1 wherein said pumping means comprises a high Q cavity tuned to the frequency of the transition between $1A_1$ and $3A_1$ levels, said crystal body being mounted within said cavity, and
   means for energizing said cavity with a microwave electric field.

8. The emitter of claim 7 including
   means for varying the frequency of emitted phonons comprising
      means for varying amplitude of said dc field to thereby change frequency of transition between said energy levels, and
      means for varying the tuned frequency of said cavity.

9. The emitter of claim 8 wherein said output means comprises a solid sonic conductor having an end portion mounted in abutment with an end portion of said crystal.

10. The phonon emitter of claim 1 wherein said means for enhancing reflection comprises flat parallel facing surface means on opposite ends of said crystal for repetitively reflecting phonons propagating along said predetermined axis.

11. A phonon amplifier comprising
an alkali halide crystal having electric dipole impurities, means for subjecting the crystal to dc field sufficient to enable said impurity to assume energy levels $1A_1$, $2A_1$, $1B_1$, and $3A_1$,
   said impurity having a rate of decay from level $3A_1 \rightarrow 2A_1$, greater than its rate of decay from level $2A_1 \rightarrow 1A_1$, and a rate of decay from level $1B_1 \rightarrow 1A_1$, greater than its rate of decay from level $3A_1 \rightarrow 1B_1$,
tuned pumping means for applying energy to said crystal at a frequency to raise said impurity to said $3A_1$ level,
   said pumping means including means for achieving a population inversion of one of a pair of transitions comprising
      a first transition between levels $3A_1$ and $1B_1$, and a second transition between levels $2A_1$, and
   means for stimulating emission of phonons of the frequency of said one transition comprising sonic coupling means for transmitting to said crystal an input vibration propagating along a predetermined axis at the frequency of said one transition, and
   utilization means responsive to phonons at the frequency of said one transition and propagated along said predetermined axis.

12. The phonon amplifier of claim 11 wherein said pumping means comprises
a high Q cavity tuned to the frequency of the transition between $1A_1$ and $3A_1$ levels,
   said crystal being mounted within said cavity, and
      means for energizing said cavity with a microwave electric field.

13. The phonon amplifier of claim 12 including
means for varying the frequency of emitted phonons comprising
   means for varying amplitude of said dc field to thereby change frequency of transition between said energy levels, and
   means for varying the tuned frequency of said cavity. sonic 14. The phonon amplifier of claim 37 wherein said coupling means comprises a solid sonic conductor having an end portion mounted in abutment with an end portion of said crystal.

* * * * *